US 9,288,502 B2

(12) United States Patent
Pandit et al.

(10) Patent No.: US 9,288,502 B2
(45) Date of Patent: *Mar. 15, 2016

(54) METHODS AND APPARATUS FOR THE USE OF SLICE GROUPS IN DECODING MULTI-VIEW VIDEO CODING (MVC) INFORMATION

(75) Inventors: Purvin Bibhas Pandit, Franklin Park, NJ (US); Peng Yin, West Windsor, NJ (US); Jill MacDonald Boyce, Manalapan, NJ (US)

(73) Assignee: THOMSON LICENSING, BOULOGNE-BILLANCOURT (FR)

( * ) Notice: Subject to any disclaimer, the term of this patent is extended or adjusted under 35 U.S.C. 154(b) by 1234 days.

This patent is subject to a terminal disclaimer.

(21) Appl. No.: 12/450,707

(22) PCT Filed: Apr. 18, 2008

(86) PCT No.: PCT/US2008/005053
§ 371 (c)(1),
(2), (4) Date: Oct. 7, 2009

(87) PCT Pub. No.: WO2008/143747
PCT Pub. Date: Nov. 27, 2008

(65) Prior Publication Data
US 2010/0111193 A1 May 6, 2010

Related U.S. Application Data

(60) Provisional application No. 60/938,363, filed on May 16, 2007.

(51) Int. Cl.
*H04N 19/174* (2014.01)
*H04N 19/467* (2014.01)
(Continued)

(52) U.S. Cl.
CPC .......... *H04N 19/467* (2014.11); *H04N 19/597* (2014.11); *H04N 19/61* (2014.11); *H04N 19/70* (2014.11)

(58) Field of Classification Search
USPC .......... 375/240.01–240.29; 348/14.08, 14.09, 348/221.11
See application file for complete search history.

(56) References Cited

U.S. PATENT DOCUMENTS 7,492,387 B2 *  2/2009  Yang et al. ................. 348/14.09
8,780,998 B2    7/2014  Pandit et al.
(Continued)

FOREIGN PATENT DOCUMENTS

| JP | 10262268 | 9/1998 |
| WO | WO 2006031925 A2 * | 3/2006 |
| WO | WO2007007923 | 1/2007 |

OTHER PUBLICATIONS

Robust Transmission of Multi-View Video Streams Using Flexible Macroblock Ordering and Systematic LT codes IEEE 2007 Argyropoulos et al.*

(Continued)

*Primary Examiner* — Sath V Perungavoor
*Assistant Examiner* — Nathnael Aynalem
(74) *Attorney, Agent, or Firm* — Robert D. Shedd; Chris Kolefas

(57) ABSTRACT

There are provided methods and apparatus for the use of slice groups in encoding and decoding multi-view video coding (MVC) information. An apparatus and method are described which encodes at least two views corresponding to multi-view video content using multiple slice groups. Furthermore, an apparatus and method are described for decoding at least two views corresponding to multi-view video content using multiple slice groups.

23 Claims, 7 Drawing Sheets

(51) Int. Cl.
*H04N 19/597* (2014.01)
*H04N 19/70* (2014.01)
*H04N 19/61* (2014.01)

(56) References Cited

U.S. PATENT DOCUMENTS

| | | | |
|---|---|---|---|
| 2006/0013318 | A1 | 1/2006 | Webb et al. |
| 2006/0256851 | A1* | 11/2006 | Wang et al. ............ 375/240.01 |
| 2007/0103558 | A1* | 5/2007 | Cai et al. ................. 348/211.11 |
| 2007/0177674 | A1* | 8/2007 | Yang ......................... 375/240.25 |
| 2007/0200923 | A1* | 8/2007 | Eleftheriadis et al. ..... 348/14.08 |
| 2007/0230567 | A1* | 10/2007 | Wang et al. ................ 375/240.1 |
| 2008/0013620 | A1 | 1/2008 | Hannuksela et al. |
| 2008/0089412 | A1* | 4/2008 | Ugur et al. ............... 375/240.12 |
| 2008/0089421 | A1* | 4/2008 | Je-Chang et al. ........ 375/240.22 |

OTHER PUBLICATIONS

Argyropoulos et al.: "Robust Transmission of Multi-view Video Streams Using Flexible Macroblock Ordering and Systematic LT Codes," 3DTV Conference, 2007, IEEE, PI, May 7, 2007, pp. 1-4.

Hannuksela et al.: "Isolated Regions in Video Coding," IEEE Transactions on Multimedia, IEEE Service Center, Piscataway, NJ, vol. 6, No. 2, Apr. 1, 2004, pp. 259-267.

Hannuksela et al.: "Slice Group Related SEI Messages," Video Standards and Drafts, Doc. No. JVT-F045, Dec. 5, 2002.

Pandit et al.: "H.264/AVC Extension for MVC Using SEI Message," Video Standards and Drafts, Doc. No. JVT-X061, Jun. 29, 2007, p. 1-14.

Pandit et al.: "H.264/AVC Extension for MVC Using SEI Message," Video Standards and Drafts, Doc. No. JVT-W067, Apr. 21, 2007, p. 1-13.

Vetro et al.: "Joint Draft 2.0 on Multiview Video Coding," Video Standards and Drafts, Doc. No. JVT-V209, Jan. 13, 2007, pp. 1-28.

Hannuksela, "Enhancements to FMO", JVT of ISO/IEC MPEG & ITU-T VCEG (ISO/IEC JTC1/SC29/WG11 and ITU-T SG16 Q.6), Document: JVT-D095. Jul. 22, 2002.

Lainema et al., "Proposal to Correct Maximum Bitrate on Level 1", JVT of ISO/IEC MPEG & ITU-T VCEG, Document: JVT-H028, 8th Meeting: Geneva, Switzerland, May 23-28, 2003.

ITU-T: "Advanced Video Coding for Generic Audiovisual Services," ITU-T Recommendation H. 264; Mar. 12, 2005, 343 pages.

Japanese Office Action mailed Jan. 13, 2015 in corresponding JP Application No. 2010-508360.

* cited by examiner

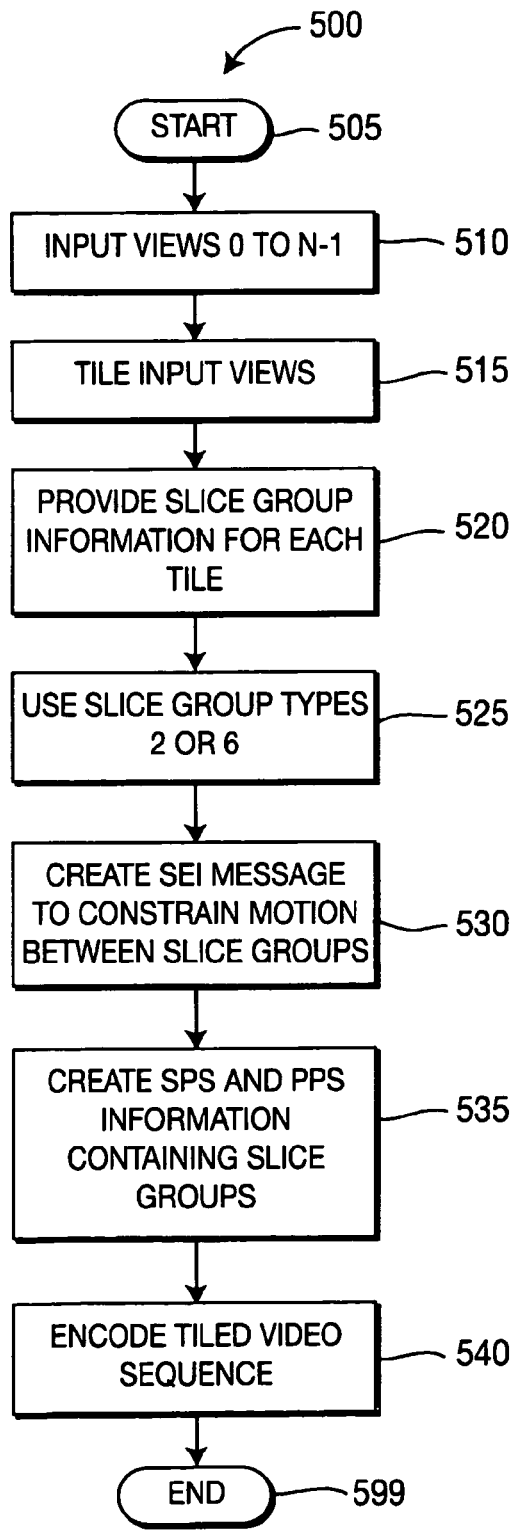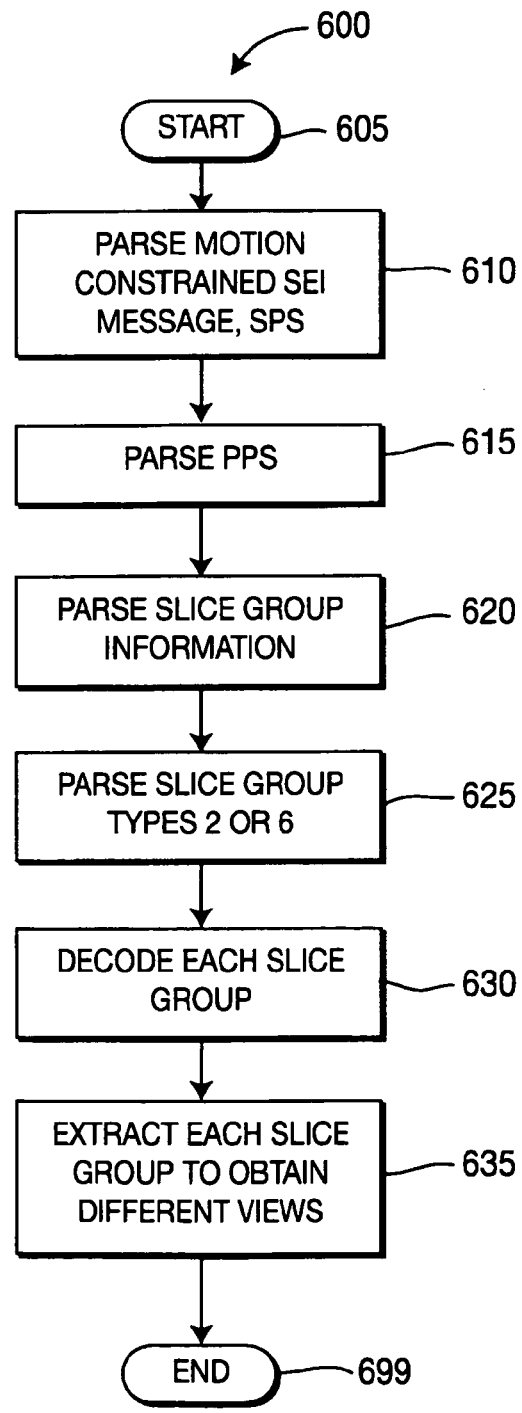
FIG. 5
FIG. 6

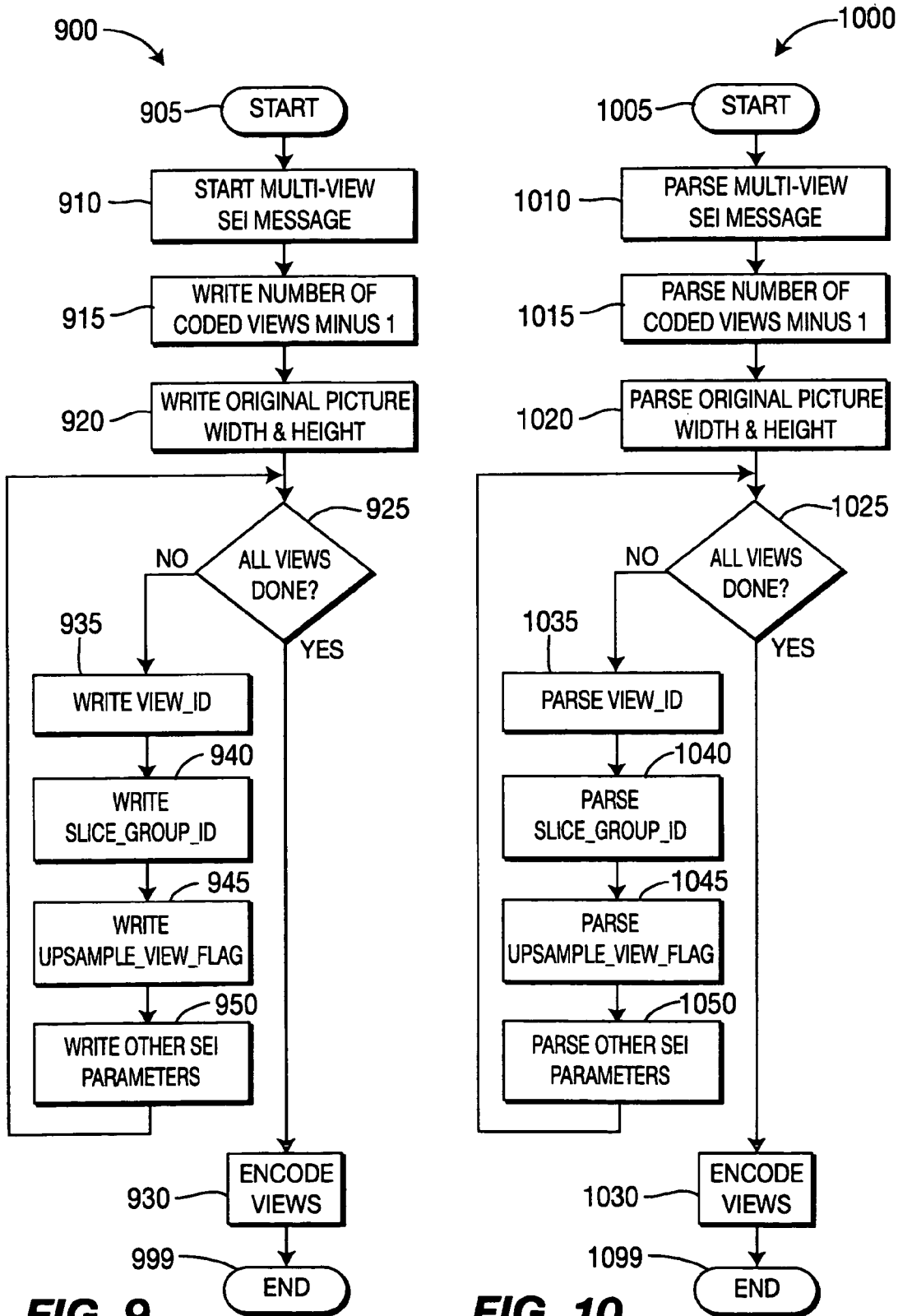

METHODS AND APPARATUS FOR THE USE OF SLICE GROUPS IN DECODING MULTI-VIEW VIDEO CODING (MVC) INFORMATION

CROSS-REFERENCE TO RELATED APPLICATIONS

This application is a National Stage Application and claims the benefit, under 35 U.S.C. §365 of International Application PCT/US2008/005053 filed Apr. 18, 2008 which was published in accordance with PCT Article 21(2) on Nov. 27, 2008 in English, and which claims the benefit of U.S. Provisional Patent Application No. 60/938,363 filed on May 16, 2007, which is incorporated by reference in its entirety. Furthermore, this application is closely related in disclosed subject matter to a concurrently filed National Stage Application having the same title which claims the benefit under 35 U.S.C. §365 of International Application PCT/US2008/005047 filed Apr. 18, 2008 which was published in accordance with PCT Article 21(2) on Nov. 27, 2008 in English, and which also claims the benefit of U.S. Provisional Patent Application No. 60/938,363 filed on May 16, 2007.

TECHNICAL FIELD

The present principles relate generally to video encoding and decoding and, more particularly, to methods and apparatus for the use of slice groups in encoding and decoding multi-view video coding (MVC) information.

BACKGROUND

The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard") provides a framework for 3D video coding through a Supplemental Enhancement Information (SEI) message referred to as a Stereo Video Information (SVI) SEI message, as shown in Table 5.

TABLE 5

| stereo_video_info( payloadSize ) { | C | Descriptor |
|---|---|---|
| field_views_flag | 5 | u(1) |
| if( field_views_flag ) | | |
|   top_field_is_left_view_flag | 5 | u(1) |
| else { | | |
|   current_frame_is_left_view_flag | 5 | u(1) |
|   next_frame_is_second_view_flag | 5 | u(1) |
| } | | |
| left_view_self_contained_flag | 5 | u(1) |
| right_view_self_contained_flag | 5 | u(1) |
| } | | |

The SVI SEI message provides the decoder with an indication that the entire coded video sequence includes pairs of pictures forming stereo-view content. Further, the SVI SEI message specifies whether the two views are arranged in field format or frame format and whether and which of those views have been coded independently. Under field format, each view of a given time instance is coded into each field of interlaced video frame. Under frame format, each alternative frame in the output order represents a view.

The MPEG-4 AVC Standard introduced additional high level syntax to partition each picture into slices. Additionally these slices can belong to different slice groups. These slice groups can have different slice group types. Multiple slice groups make it possible to map the sequence of coded macroblocks (MBs) to the decoded picture in a number of flexible ways. The allocation of macroblocks is determined by a macroblock to slice group map that indicates which slice group each macroblock belongs to. The MPEG-4 AVC Standard supports the following different slice group types: interleaved slice groups; dispersed slice group mapping; one or more "foreground" slice groups and a "leftover" slice group; changing slice groups; and explicit assignment of a slice group to each slice group map unit. This provides a lot of flexibility in how the different slices are coded. The primary purpose of slice groups can be considered to be error resiliency. Another application for slice groups is region of interest (ROI) coding.

The MPEG-4 AVC Standard also includes a SEI message that is used to specify the constraint of inter prediction over slice group boundaries. This can be useful for parallel processing.

SUMMARY

These and other drawbacks and disadvantages of the prior art are addressed by the present principles, which are directed to methods and apparatus for the use of slice groups in encoding and decoding multi-view video coding (MVC) information.

According to an aspect of the present principles, there is provided an apparatus. The apparatus includes an encoder for encoding at least two views corresponding to multi-view video content using multiple slice groups.

According to another aspect of the present principles, there is provided a method. The method includes encoding at least two views corresponding to multi-view video content using multiple slice groups.

According to yet another aspect of the present principles, there is provided an apparatus. The apparatus includes a decoder for decoding at least two views corresponding to multi-view video content using multiple slice groups.

According to a further aspect of the present principles, there is provided a method. The method includes decoding at least two views corresponding to multi-view video content using multiple slice groups.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 5 is a flow diagram for an exemplary method for encoding multi-view video content using slice groups, in accordance with an embodiment of the present principles;

FIG. 6 is a flow diagram for an exemplary method for decoding multi-view video content using slice groups, in accordance with an embodiment of the present principles;

FIG. 9 is a flow diagram for yet another exemplary method for encoding multi-view video content using slice groups, in accordance with an embodiment of the present principles; and FIG. 10 is a flow diagram for yet another exemplary method for decoding multi-view video content using slice groups, in accordance with an embodiment of the present principles.

DETAILED DESCRIPTION

Figure 1:
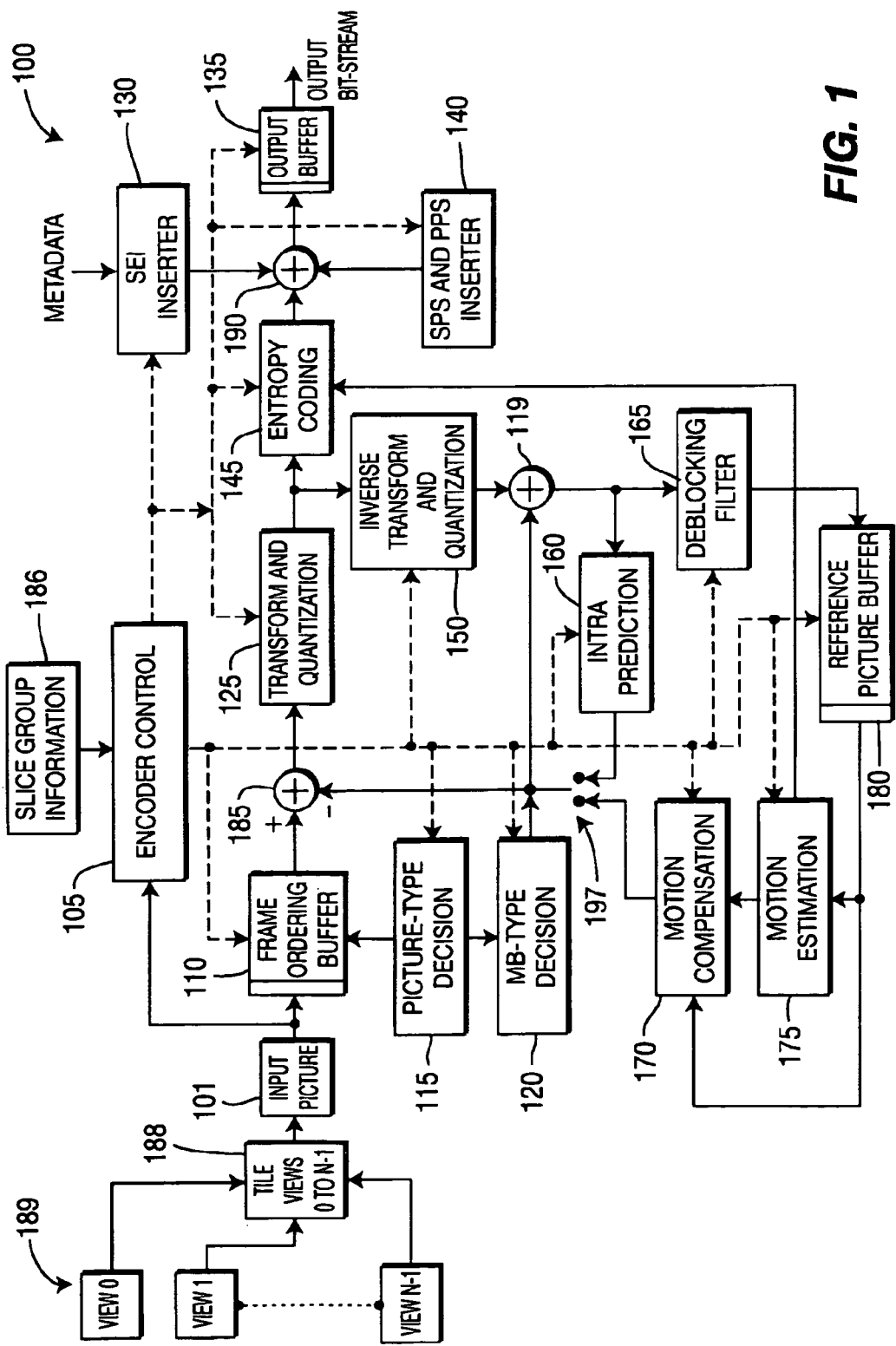
FIG. 1 is a block diagram for a video encoder capable of performing video encoding in accordance with a multi-view video coding (MVC) extension of the MPEG-4 AVC Standard.

The present principles are directed to methods and apparatus for the use of slice groups in encoding and decoding multi-view video coding (MVC) information.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Turning to FIG. 1, a video encoder capable of performing video encoding in accordance with a multi-view video coding (MVC) extension of the MPEG-4 AVC Standard is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, an input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

A first output of the picture-type decision module 115 is connected in signal communication with a third input of a frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and with an inverting input of the combiner 185.

A second input of the encoder control receives slice group information 186. View 0 through View N−1, collectively represented by the reference numeral 189, provided to a tiling module 188 that tiles the views to provide an input picture(s) 101.

First inputs of the frame ordering buffer 110 and the encoder controller 105 are available as input of the encoder 100, for receiving an input picture 101.

Moreover, an input of the Supplemental Enhancement Information (SEI) inserter 130 is available as an input of the encoder 100, for receiving metadata. An output of the output buffer 135 is available as an output of the encoder 100, for outputting a bitstream.

Figure 2:
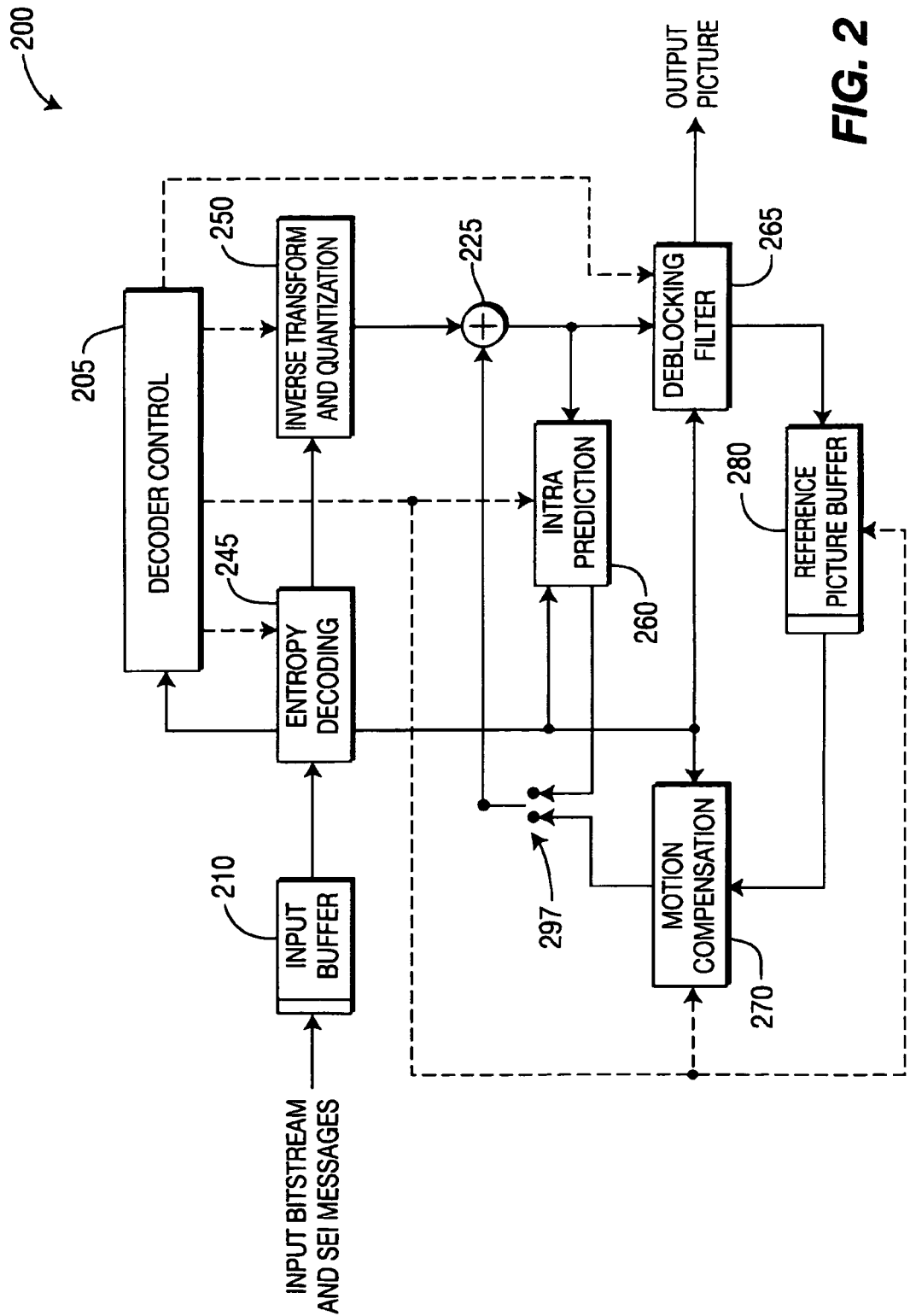
FIG. 2 is a block diagram for a video decoder capable of performing video decoding in accordance with a multi-view video coding (MVC) extension of the MPEG-4 AVC Standard.

Turning to FIG. 2, a video decoder capable of performing video decoding in accordance with a multi-view video coding (MVC) extension of the MPEG-4 AVC Standard is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, with a first input of the motion compensator 270, and with a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

Figure 3:
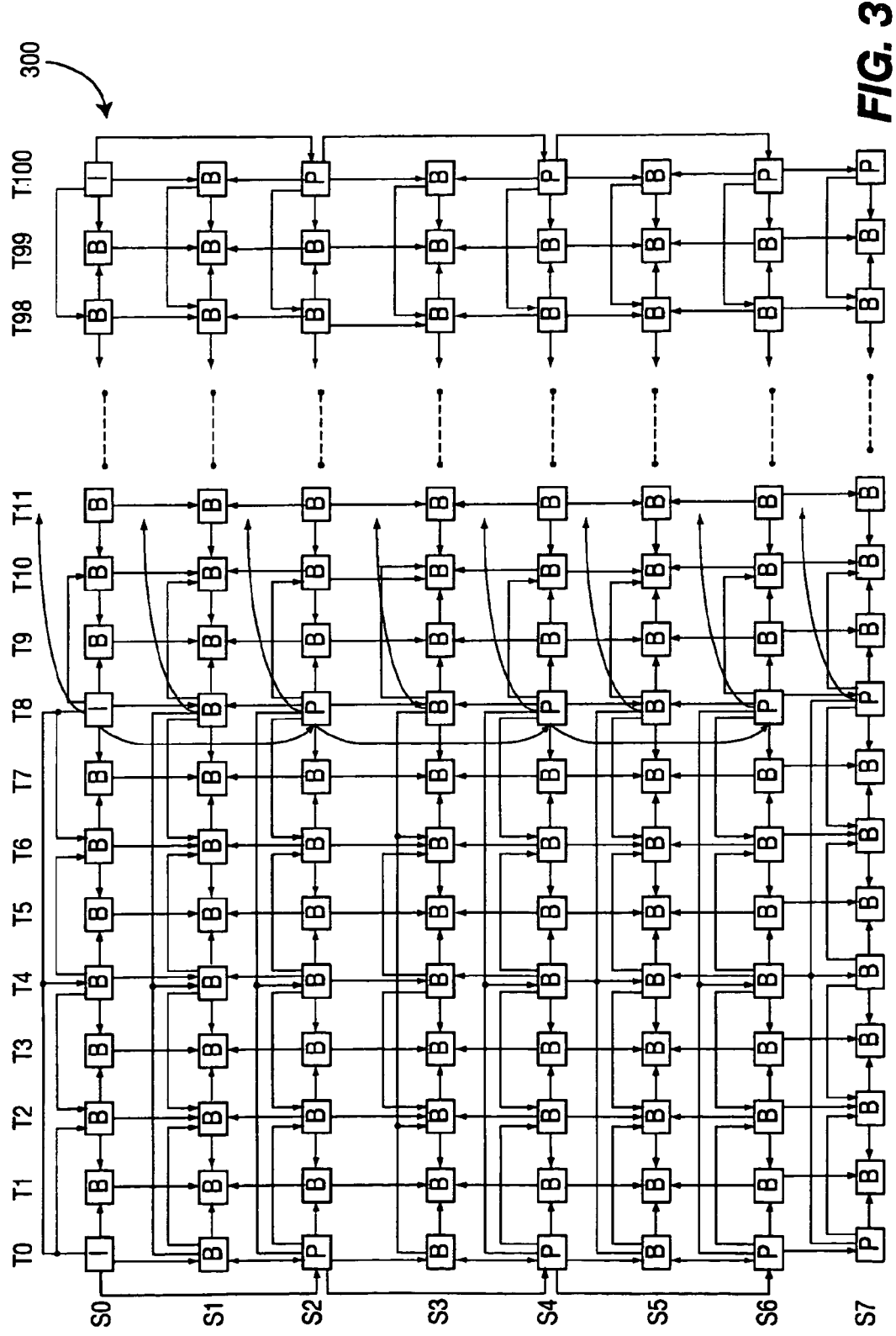
FIG. 3 is a diagram for an inter-view-temporal prediction structure based on the MPEG-4 AVC standard, using hierarchical B pictures, to which the present principles may be applied, in accordance with an embodiment of the present principles.

Turning to FIG. 3, an inter-view-temporal prediction structure based on the MPEG-4 AVC standard, using hierarchical B pictures, is indicated generally by the reference numeral 300.

Figure 4:
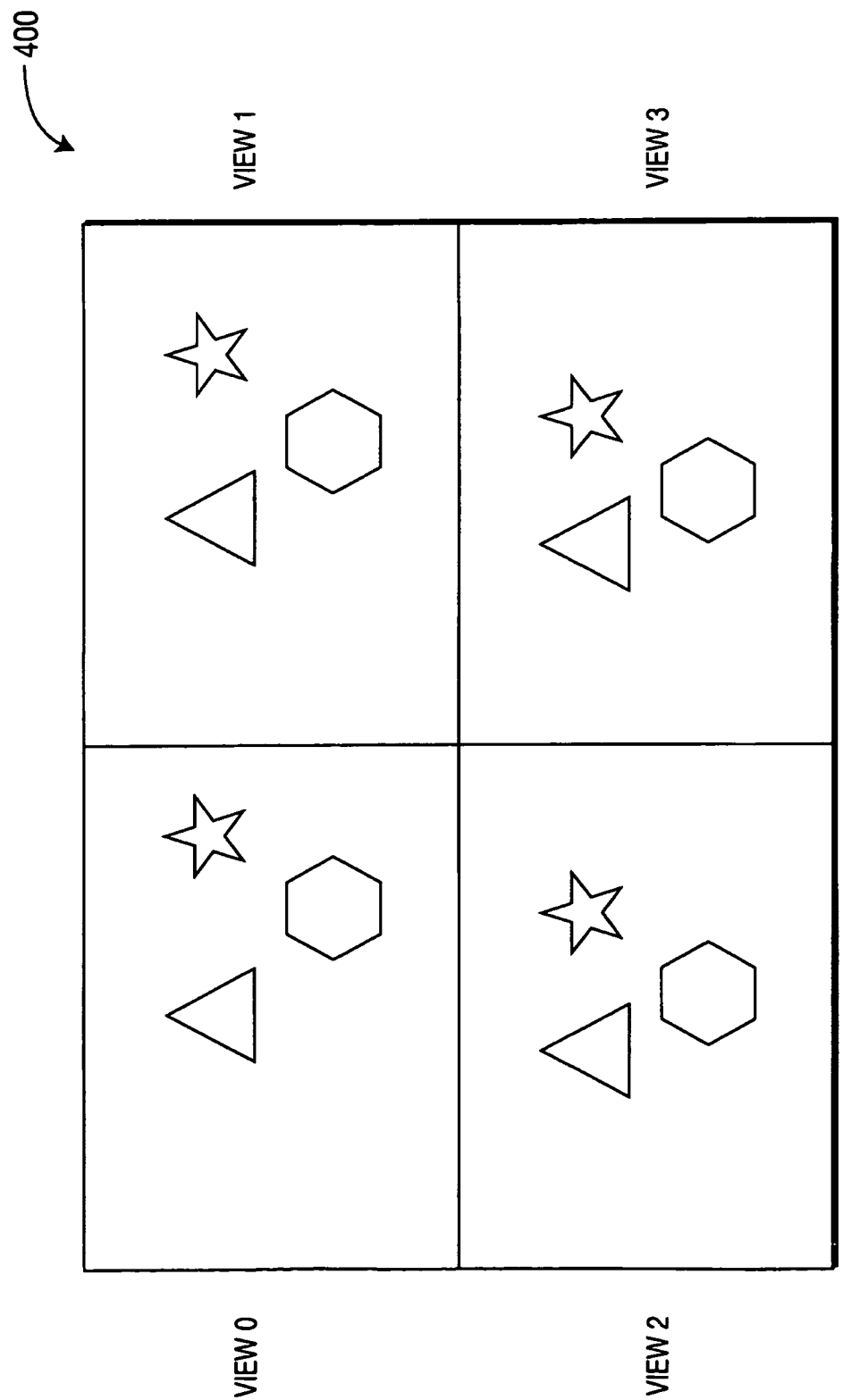
FIG. 4 is a diagram for an exemplary tiling of four views on a single frame, in accordance with an embodiment of the present principles.

Turning to FIG. 4, an exemplary tiling of four views on a single frame is indicated generally by the reference numeral 400.

In accordance with the present principles, we extend the MPEG-4 AVC Standard framework to enable the coding and decoding of multi-view video content using slice groups. To support this new capability, we have developed a new high level syntax to signal multi-view video information in slices using the MPEG-4 AVC Standard. As noted above, although one or more embodiments are described herein with respect to the MPEG-4 AVC Standard, the present principles are not so limited and can be extended to other video coding techniques.

In accordance with the present principles, slice groups compatible with the MPEG-4 AVC Standard are used to code multiple views in a single frame. As previously mentioned, the MPEG-4 AVC Standard introduced additional high level syntax to partition each picture into slices. Additionally these slices can belong to different slice groups. These slice groups can have different slice group types. The MPEG-4 AVC Standard supports the following different slice group types: interleaved slice groups; dispersed slice group mapping; one or more "foreground" slice groups and a "leftover" slice group; changing slice groups; and explicit assignment of a slice group to each slice group map unit. This provides a lot of flexibility in how the different slices are coded. The primary purpose of slice groups can be considered to be error resiliency. Another application for slice groups is region of interest (ROI) coding. AVC also includes an SEI message that is used to specify the constraint of inter prediction over slice group boundaries. This can be useful for parallel processing.

Taking advantage of the fact that different slice groups can be coded and decoded independently using the SEI message and also the concept of slice groups, we can code each picture from a different view as a separate slice group. As noted above, FIG. 4 shows an exemplary tiling 400 of different views on a single frame. In the framework of the MPEG-4 AVC Standard, each tiled view can be considered to be a particular slice group. For example, the top-left quadrant may be slice group 1, the top-right quadrant may be slice group 2, the bottom-left quadrant may be slice group 3, and the bottom-right quadrant may be slice group 4. One possible method to achieve this is to use either slice group type map types 2 and 6. Slice group type 2 represents "foreground" slice groups and a "leftover" slice group. In accordance with the present principles, the "foreground" slice groups can be specified as a rectangular region with no "leftover" region or with one view as the leftover region. Any other combination that results in non-overlapping views is also possible. Slice group type 6 allows explicitly signaling of the macroblock to slice group mapping in the syntax. Thus, for each view, it is possible to signal which slice group the view belongs to.

After this signaling, each view can then be constrained for inter prediction using an SEI message. TABLE 1 shows motion-constrained slice group set Supplemental Enhancement Information (SEI) message syntax for use with the MPEG-4 AVC Standard, in accordance with an embodiment of the present principles. This way we are sure that each view predicts from its own view only.

TABLE 1

| motion_constrained_slice_group_set( payloadSize ) { | C | Descriptor |
|---|---|---|
| num_slice_groups_in_set_minus1 | 5 | ue(v) |
| for( i = 0; i <= num_slice_groups_in_set_minus1; i++) | | |
| slice_group_id[ i ] | 5 | u(v) |
| exact_sample_value_match_flag | 5 | u(1) |
| pan_scan_rect_flag | 5 | u(1) |
| if( pan_scan_rect_flag ) | | |
| pan_scan_rect_id | 5 | ue(v) |
| } | | |

The view information from the different slice groups can be extracted in a few different ways. In one embodiment, we can use the SEI message as shown in TABLE 3. TABLE 3 illustrates a Multi-view Video Coding (MVC) Supplemental Enhancement Information (SEI) message for use with MPEG-4 AVC Standard compatible slice groups.

TABLE 3

| multiview_display_info( payloadSize ) { | C | Descriptor |
|---|---|---|
| num_coded_views_minus1 | 5 | ue(v) |
| org_pic_width_in_mbs_minus1 | 5 | ue(v) |
| org_pic_height_in_mbs_minus1 | 5 | ue(v) |
| for( i = 0; i <= num_coded_views_minus1; i++ ) { | | |
| view_id[ i ] | 5 | ue(v) |
| slice_group_id[ view_id[i] ] | 1 | u(v) |
| upsample_view_flag[view_id[ i ]] | 5 | u(1) |
| if(upsample_view_flag[view_id[ i ]]) | | |
| upsample_filter[view_id[ i ]] | 5 | u(2) |
| if(upsample_fiter[view_id[i]] == 3) { | | |
| vert_dim[view_id[i]] | 5 | ue(v) |
| hor_dim[view_id[i]] | 5 | ue(v) |
| quantizer[view_id[i]] | 5 | ue(v) |
| for (yuv= 0; yuv< 3; yuv++) { | | |
| for (y = 0; y < vert_dim[view_id[i]] - 1; y ++) { | | |
| for (x = 0; x < hor_dim[view_id[i]] - 1; x ++) | | |
| filter_coeffss[view_id[i]] [yuv][y][x] | 5 | se(v) |
| } | | |
| } | | |
| } | | |
| } | | |
| } | | |

The portions which describe the location of each view have been removed since this information is readily available from the PPS. An additional syntax, referred to as slice_group_id [view_id[i]], is added. This additional syntax is used to map the slice groups that are signaled in the PPS to the view_id they correspond to. Thus using this information one can determine which slice group corresponds to which view_id. The semantics of slice_group_id[view_id[i]] are as follows:

slice_group_id[view_id[i]] identifies a slice group of the slice group map unit in raster scan order that corresponds to a view specified by view_id[i]. The size of the slice_group_id[view_id[i]] syntax element is Ceil(Log 2(num_slice_groups_minus1+1)) bits. The value of slice_group_id[view_id[i]] shall be in the range of 0 to num_slice_groups_minus1, inclusive.

In another embodiment, we can signal the view information in the PPS along with the slice group information. An example of this embodiment is indicated in TABLE 2. That is, TABLE 2 shows modified Picture Parameter Set (PPS) RBSP syntax, in accordance with an embodiment of the present principles.

TABLE 2

| pic_parameter_set_rbsp( ) { | C | Descriptor |
|---|---|---|
|   pic_parameter_set_id | 1 | ue(v) |
|   seq_parameter_set_id | 1 | ue(v) |
|   entropy_coding_mode_flag | 1 | u(1) |
|   pic_order_present_flag | 1 | u(1) |
|   num_slice_groups_minus1 | 1 | ue(v) |
|   if( num_slice_groups_minus1 > 0 ) { | | |
|     slice_group_map_type | 1 | ue(v) |
|     if( slice_group_map_type = = 0 ) | | |
|       for( iGroup = 0; iGroup <= num_slice_groups_minus1; iGroup++ ) | | |
|         run_length_minus1[ iGroup ] | 1 | ue(v) |
|     else if( slice_group_map_type = = 2 ) | | |
|       for( iGroup = 0; iGroup < num_slice_groups_minus1; iGroup++ ) { | | |
|         top_left[ iGroup ] | 1 | ue(v) |
|         bottom_right[ iGroup ] | 1 | ue(v) |
|         view_id[iGroup] | 1 | ue(v) |
|       } | | |
|     else if( slice_group_map_type = = 3 \|\| | | |
|         slice_group_map_type = = 4 \|\| | | |
|         slice_group_map_type = = 5 ) { | | |
|       slice_group_change_direction_flag | 1 | u(1) |
|       slice_group_change_rate_minus1 | 1 | ue(v) |
|     } else if( slice_group_map_type = = 6 ) { | | |
|       pic_size_in_map_units_minus1 | 1 | ue(v) |
|       for( i = 0; i <= pic_size_in_map_units_minus1; i++ ) | | |
|         slice_group_id[ i ] | 1 | u(v) |
|       for( i = 0; i <= num_slice_groups_minus1; i++ ) | | |
|         view_id[ i ] | 1 | ue(v) |
|     } | | |
|   } | | |
|   num_ref_idx_l0_active_minus1 | 1 | ue(v) |
|   num_ref_idx_l1_active_minus1 | 1 | ue(v) |
|   weighted_pred_flag | 1 | u(1) |
|   weighted_bipred_idc | 1 | u(2) |
|   pic_init_qp_minus26 /* relative to 26 */ | 1 | se(v) |
|   pic_init_qs_minus26 /* relative to 26 */ | 1 | se(v) |
|   chroma_qp_index_offset | 1 | se(v) |
|   deblocking_filter_control_present_flag | 1 | u(1) |
|   constrained_intra_pred_flag | 1 | u(1) |
|   redundant_pic_cnt_present_flag | 1 | u(1) |
|   if( more_rbsp_data( ) ) { | | |
|     transform_8x8_mode_flag | 1 | u(1) |
|     pic_scaling_matrix_present_flag | 1 | u(1) |
|     if( pic_scaling_matrix_present_flag ) | | |
|       for( i = 0; i < 6 + 2* transform_8x8_mode_flag; i++ ) { | | |
|         pic_scaling_list_present_flag[ i ] | 1 | u(1) |
|         if( pic_scaling_list_present_flag[ i ] ) | | |
|           if( i < 6 ) | | |
|             scaling_list( ScalingList4x4[ i ], 16, | 1 | |
|               UseDefaultScalingMatrix4x4Flag[ i ] ) | | |
|           else | | |
|             scaling_list( ScalingList8x8[ i − 6 ], 64, | 1 | |
|               UseDefaultScalingMatrix8x8Flag[ i − 6 ] ) | | |
|       } | | |
|     second_chroma_qp_index_offset | 1 | se(v) |
|   } | | |
|   rbsp_trailing_bits( ) | 1 | |
| } | | |

Here, when the slice group type is 2 we signal the view_id information in addition to the left and right support. In case the slice group type is 6, we then provide a mapping from the slice_group_id to view_id. This affords each slice group an associated view_id. This information can then be used to extract the different views.

Additionally, we have adapted the SEI message by adding a flag called self_contained_flag[i] which indicates that the view identified by view_id[i] does not depend on any other view for inter-prediction. The self_contained_flag[i] is shown in TABLE 4, and defined as follows:

self_contained_flag[i] equal to 1 indicates that no inter prediction operations within the decoding process for the view identified by view_id[i] part of the coded video picture refer to reference areas that are part of an area which correspond to view_id[j] and i is not equal to j. self_contained_flag[i] equal to 0 indicates that some inter prediction operations within the decoding process for the view identified by view_id[i] part of the coded video picture may or may not refer to reference areas that are part of an area which correspond to view_id[j] and i is not equal to j.

TABLE 4

| multiview_display_info( payloadSize ) { | C | Descriptor |
|---|---|---|
|   num_coded_views_minus1 | 5 | ue(v) |
|   org_pic_width_in_mbs_minus1 | 5 | ue(v) |
|   org_pic_height_in_mbs_minus1 | 5 | ue(v) |
|   for( i = 0; i <= num_coded_views_minus1; i++ ) { | | |

TABLE 4-continued

```
multiview_display_info( payloadSize ) {                      C   Descriptor
    view_id[ i ]                                             5   ue(v)
    self_contained_flag[ i ]                                 1   u(1)
    num_parts[view_id[ i ]]                                  5   ue(v)
    for( j = 0; j <= num_parts[i]; j++ ) {
        flip_dir[view_id[ i ]] [ j ]                         5   u(2)
        loc_left_offset[view_id[ i ]] [ j ]                  5   ue(v)
        loc_top_offset[view_id[ i ]] [ j ]                   5   ue(v)
        frame_crop_left_offset[view_id[ i ]] [ j ]           5   ue(v)
        frame_crop_right_offset[view_id[ i ]] [ j ]          5   ue(v)
        frame_crop_top_offset[view_id[ i ]] [ j ]            5   ue(v)
        frame_crop_bottom_offset[view_id[ i ]] [ j ]         5   ue(v)
    }
    upsample_view_flag[view_id[ i ]]                         5   u(1)
    if(upsample_view_flag[view_id[ i ]])
        upsample_filter[view_id[ i ]]                        5   u(2)
    if(upsample_fiter[view_id[i]] == 3) {
        vert_dim[view_id[i]]                                 5   ue(v)
        hor_dim[view_id[i]]                                  5   ue(v)
        quantizer[view_id[i]]                                5   ue(v)
        for (yuv= 0; yuv< 3; yuv++) {
            for (y = 0; y < vert_dim[view_id[i]] – 1;
            y ++) {
                for (x = 0; x < hor_dim[view_id[i]] – 1;
                x ++)
                    filter_coeffss[view_id[i]] [yuv][y][x]   5   se(v)
            }
        }
    }
}
```

Turning to FIG. 5, an exemplary method for encoding multi-view video content using slice groups is indicated generally by the reference numeral 500.

The method 500 includes a start block that passes control to a function block 510. The function block 510 inputs views 0 to N–1, and passes control to a function block 515. The function block 515 tiles the input views, and passes control to a function block 520. The function block 520 provides slice group information for each tile, and passes control to a function block 525. The function block 525 uses the slice group type 2 or 6, and passes control to a function block 530. The function block 530 creates a Supplemental Enhancement Information (SEI) message to constrain motion between slice groups, and passes control to a function block 535. The function block 535 creates Sequence Parameter Set (SPS) and Picture Parameter Set (PPS) information including slice groups, and passes control to a function block 540. The function block 540 encodes the tiled video sequence, and passes control to an end block 599.

Turning to FIG. 6, an exemplary method for decoding multi-view video content using slice groups is indicated generally by the reference numeral 600.

The method 600 includes a start block 605 that passes control to a function block 610. The function block 610 parses a motion constrained Supplemental Enhancement Information (SEI) message and a Sequence Parameter Set (SPS), and passes control to a function block 615. The function block 615 parses a Picture Parameter Set (PPS), and passes control to a function block 620. The function block 620 parses slice group information, and passes control to a function block 625.

The function block 625 parses the slice group types 2 or 6, and passes control to a function block 630. The function block 630 decodes each slice group, and passes control to a function block 635. The function block 635 extracts each slice group to obtain different views, and passes control to an end block 699.

Figure 7:
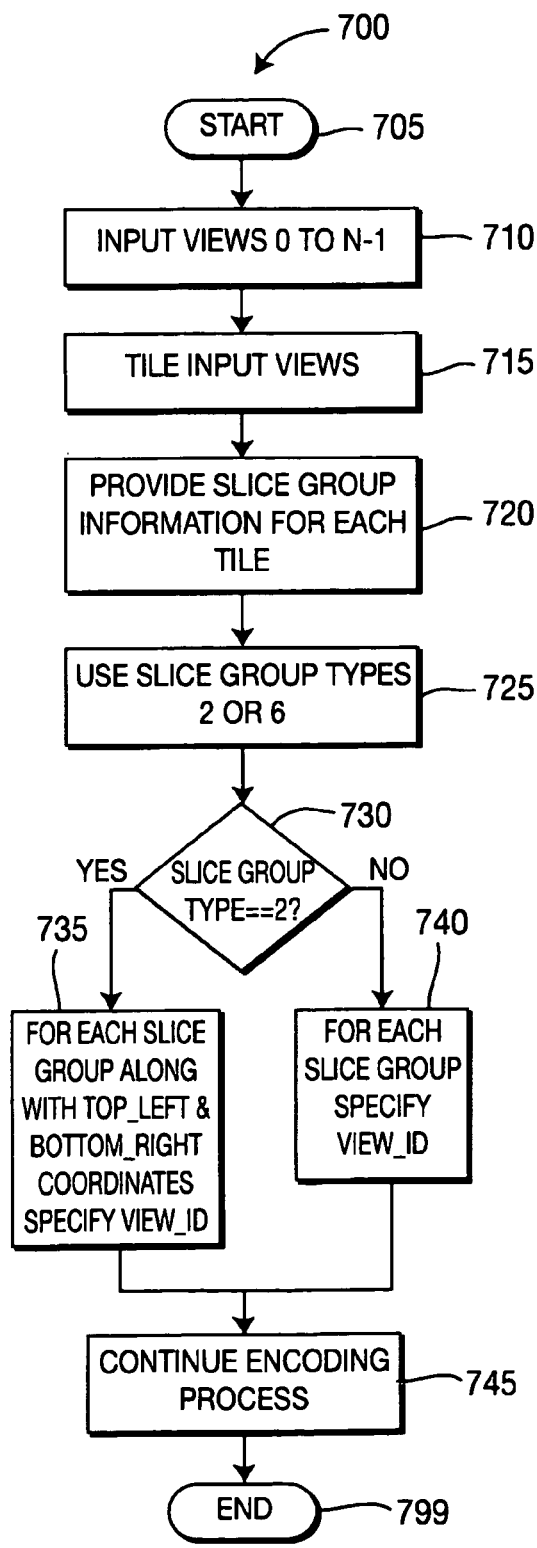
FIG. 7 is a flow diagram for another exemplary method for encoding multi-view video content using slice groups, in accordance with an embodiment of the present principles.

Turning to FIG. 7, another exemplary method for encoding multi-view video content using slice groups is indicated generally by the reference numeral 700.

The method 700 includes a start block 705 that passes control to a function block 710. The function block 710 inputs views 0 to N–1, and passes control to a function block 715. The function block 715 tiles the input views, and passes control to a function block 720. The function block 720 provides slice group information for each tile, and passes control to a function block 725. The function block 725 uses slice group types 2 or 6, and passes control to a decision block 730. The decision block 730 determines whether or not the current slice group type is equal to 2. If so, the control is passed to a function block 735. Otherwise, control is passed to a function block 740.

The function block 735 specifies the view_id for each slice group along with the top_left and bottom_right coordinates, and passes control to a function block 745.

The function block 745 continues the encoding process, and passes control to an end block 799.

The function block 740 specifies the view_id for each slice group, and passes control to the function block 745.

Figure 8:
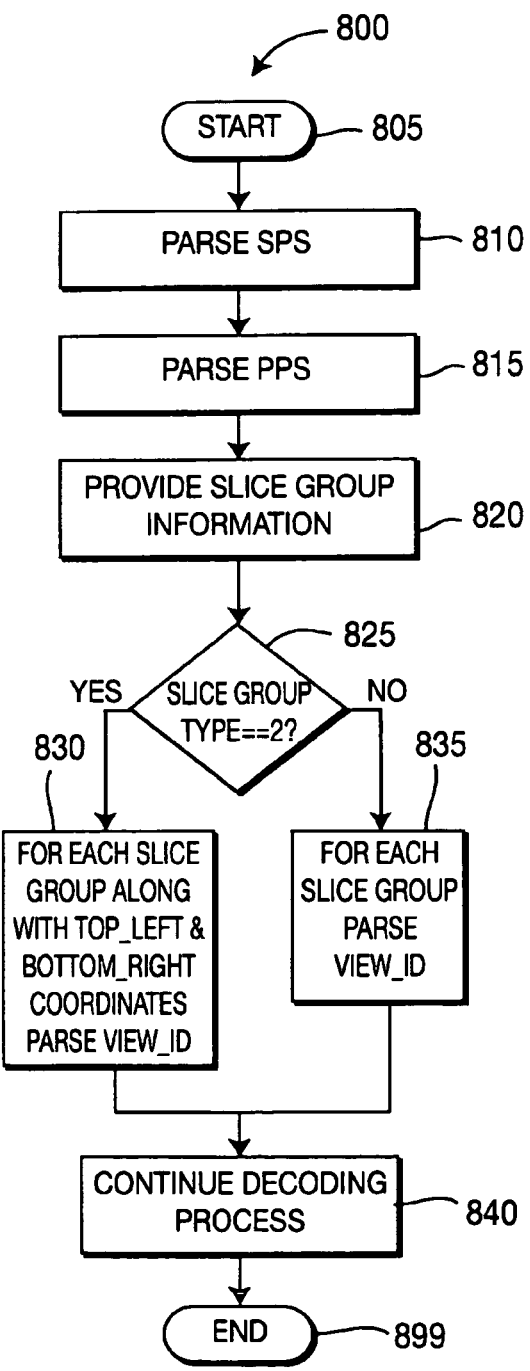
FIG. 8 is a flow diagram for another exemplary method for decoding multi-view video content using slice groups, in accordance with an embodiment of the present principles.

Turning to FIG. 8, another exemplary method for decoding multi-view video content using slice groups is indicated generally by the reference numeral 800.

The method 800 includes a start block 805 that passes control to a function block 810. The function block 810 parses a Sequence Parameter Set (SPS), and passes control to a function block 815. The function block 815 parses a Picture Parameter Set (PPS), and passes control to a function block 820. The function block 820 parses slice group information, and passes control to a decision block 825. The decision block 825 determines whether or not the current slice group type is equal to type 2. If so, then control is passed to a function block 830. Otherwise, control is passed to a function block 835.

The function block 830 parses the view_id for each slice group along with the top_left and bottom_right coordinates, and passes control to a function block 840.

The function block 840 continues the decoding process, and passes control to an end block 899.

The function block 835 parses the view_id for each slice group, and passes control to the function block 840.

Turning to FIG. 9, yet another exemplary method for encoding multi-view video content using slice groups is indicated generally by the reference numeral 900.

The method 900 includes a start block 905 that passes control to a function block 910. The function block 910 starts a multi-view video coding Supplemental Enhancement Information (SEI) message, and passes control to a function block 915. The function block 915 writes the number of coded views minus 1, and passes control to a function block 920. The function block 920 writes the original picture width and height, and passes control to a decision block 925. The decision block 925 determines whether or not all views are done. If so, then control is passed to a function block 930. Otherwise, control is passed to a function block 935.

The function block 930 encodes the views, and passes control to an end block 999.

The function block 935 writes the view_id in the Supplemental Enhancement Information (SEI) message, and passes control to a function block 940. The function block 940 writes the slice_group_id, and passes control to a function block 945. The function block 945 writes the upsample_view_flag in the Supplemental Enhancement Information (SEI) message, and passes control to a function block 950. The function block 950 writes other Supplemental Enhancement Information (SEI) parameters in the Supplemental Enhancement Information (SEI) message, and returns control to the decision block 925.

Turning to FIG. 10, yet another exemplary method for decoding multi-view video content using slice groups is indicated generally by the reference numeral 1000.

The method 1000 includes a start block 1005 that passes control to a function block 1010. The function block 1010 parses a multi-view video Supplemental Enhancement Information (SEI) message, and passes control to a function block 1015. The function block 1015 parses the number of coded views minus 1, and passes control to a function block 1020. The function block 1020 parses the original picture width and height, and passes control to a decision block 1025. The decision block 1025 determines whether or not all views are done. If so, the control is passed to a function block 1030. Otherwise, control is passed to a function block 1035.

The function block 1030 encodes the views, and passes control to an end block 1099.

The function block 1035 parses the view_id, and passes control to a function block 1040. The function block 1040 parses the slice_group_id, and passes control to a function block 1045. The function block 1045 parses the upsample_view_flag, and passes control to a function block 1050. The function block 1050 parses other Supplemental Enhancement Information (SEI) parameters, and returns control to the decision block 1025.

A description will now be given of some of the many attendant advantages/features of the present invention, some of which have been mentioned above. For example, one advantage/feature is an apparatus having an encoder for encoding at least two views corresponding to multi-view video content using multiple slice groups.

Another advantage/feature is the apparatus having the encoder as described above, wherein at least some of the multiple slice groups are compliant with an existing video coding standard or an existing video coding recommendation.

Yet another advantage/feature is the apparatus having the encoder as described above, wherein at least some of the multiple slice groups are compliant with the International Organization for Standardization/International Electrotechnical Commission Moving Picture Experts Group-4 Part 10 Advanced Video Coding standard/International Telecommunication Union, Telecommunication Sector H.264 recommendation.

Still another advantage/feature is the apparatus having the encoder as described above, wherein the encoder codes each of the at least two views as a respective separate one of the multiple slice groups.

Moreover, another advantage/feature is the apparatus having the encoder that codes each of the at least two views as a respective separate one of the multiple slice groups as described above, wherein the encoder uses a Supplemental Enhancement Information message to code each of the at least two views as the respective separate one of the multiple slice groups.

Further, another advantage/feature is the apparatus having the encoder that uses the Supplemental Enhancement Information (SEI) message as described above, wherein the Supplemental Enhancement Information message indicates that at least some of the multiple slice groups are motion constrained.

Also, another advantage/feature is the apparatus having the encoder as described above, wherein the encoder modifies an existing Supplemental Enhancement Information message of an existing video coding standard or video coding recommendation to include slice group identifier information.

Additionally, another advantage/feature is the apparatus having the encoder as described above, wherein the encoder modifies a Picture Parameter Set to signal view identifier information and slice group identifier information for the at least two views.

Moreover, another advantage/feature is the apparatus having the encoder as described above, wherein the Picture Parameter Set is modified to specify at least one of a slice group type 2 and a slice group type 6.

Further, another advantage/feature is the apparatus having the encoder wherein the Picture Parameter Set is modified as described above, wherein a mapping is provided from the view identifier information to the slice group identifier information, when the slice group type 2 and the slice group type 6 is specified in the Picture Parameter Set.

Also, another advantage/feature is the apparatus having the encoder as described above, wherein the encoder signals that each of the at least two views is independently coded, using a high level syntax element.

Additionally, another advantage/feature is the apparatus having the encoder as described above, wherein the high level syntax element corresponds to at least at one of a slice header level, a sequence parameter set level, a picture parameter set level, a view parameter set level, a network abstraction layer unit header level, and a level corresponding to a supplemental enhancement information message.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a decoder for decoding, from a single picture, at least two views corresponding to multi-view video content using multiple slice groups,
wherein the at least two views correspond to a same or similar scene, and
wherein said decoder decodes each of the at least two views as a respective separate one of the multiple slice groups.

2. The apparatus of claim 1, wherein at least some of the multiple slice groups are compliant with an existing video coding standard or an existing video coding recommendation.

3. The apparatus of claim 1, wherein at least some of the multiple slice groups are compliant with the International Organization for Standardization/International Electrotechnical Commission Moving Picture Experts Group-4 Part 10 Advanced Video Coding standard/International Telecommunication Union, Telecommunication Sector H.264 recommendation.

4. The apparatus of claim 1, wherein said decoder uses a Supplemental Enhancement Information message to decode each of the at least two views as the respective separate one of the multiple slice groups.

5. The apparatus of claim 4, wherein the Supplemental Enhancement Information message indicates that at least some of the multiple slice groups are motion constrained.

6. The apparatus of claim 1, wherein said decoder reads a modified version of an existing Supplemental Enhancement Information message of an existing video coding standard or video coding recommendation, the existing Supplemental Enhancement Information message modified to include slice group identifier information.

7. The apparatus of claim 1, wherein said decoder reads a modified version of a Picture Parameter Set, the Picture Parameter Set modified to signal view identifier information and slice group identifier information for the at least two views.

8. The apparatus of claim 7, wherein the Picture Parameter Set is modified to specify at least one of a slice group type 2 and a slice group type 6.

9. The apparatus of claim 8, wherein a mapping is provided from the view identifier information to the slice group identifier information, when the slice group type 6 is specified in the Picture Parameter Set.

10. The apparatus of claim 1, wherein said decoder determines that each of the at least two views is independently coded, using a high level syntax element.

11. The apparatus of claim 10, wherein the high level syntax element corresponds to at least at one of a slice header level, a sequence parameter set level, a picture parameter set level, a view parameter set level, a network abstraction layer unit header level, and a level corresponding to a supplemental enhancement information message.

12. In a video decoder, a method, comprising:
decoding, from a single picture, at least two views corresponding to multi-view video content using multiple slice groups,
wherein the at least two views correspond to a same or similar scene, and
wherein said decoding step decodes each of the at least two views as a respective separate one of the multiple slice groups.

13. The method of claim 12, wherein at least some of the multiple slice groups are compliant with an existing video coding standard or an existing video coding recommendation.

14. The method of claim 12, wherein at least some of the multiple slice groups are compliant with the International Organization for Standardization/International Electrotechnical Commission Moving Picture Experts Group-4 Part 10 Advanced Video Coding standard/International Telecommunication Union, Telecommunication Sector H.264 recommendation.

15. The method of claim 12, wherein said decoding step uses a Supplemental Enhancement Information message to decode each of the at least two views as the respective separate one of the multiple slice groups.

16. The method of claim 15, wherein the Supplemental Enhancement Information message indicates that at least some of the multiple slice groups are motion constrained.

17. The method of claim 12, wherein said decoding step comprises reading a modified version of an existing Supplemental Enhancement Information message of an existing video coding standard or video coding recommendation, the existing Supplemental Enhancement Information message modified to include slice group identifier information.

18. The method of claim 12, wherein said decoding step comprises reading a modified version of a Picture Parameter Set, the Picture Parameter Set modified to signal view identifier information and slice group identifier information for the at least two views.

19. The method of claim 18, wherein the Picture Parameter Set is modified to specify at least one of a slice group type 2 and a slice group type 6.

20. The method of claim 19, wherein a mapping is provided from the view identifier information to the slice group identifier information, when the slice group type 6 is specified in the Picture Parameter Set.

21. The method of claim 12, wherein said decoding step comprises determining that each of the at least two views is independently coded, using a high level syntax element.

22. The method of claim 21, wherein the high level syntax element corresponds to at least at one of a slice header level, a sequence parameter set level, a picture parameter set level, a view parameter set level, a network abstraction layer unit header level, and a level corresponding to a supplemental enhancement information message.

23. A non-transitory computer-readable storage media having video signal data encoded thereupon, comprising:
at least two views corresponding to multi-view video content encoded by an encoder into a single picture using multiple slice groups,
wherein the at least two views correspond to a same or similar scene, and
wherein each of the at least two views is coded as a respective separate one of the multiple slice groups.

* * * * *